Jan. 24, 1939.   J. H. HALL   2,144,970
TOPPED BEET GATHERING AND LOADING MACHINE
Filed Jan. 3, 1938   2 Sheets-Sheet 1
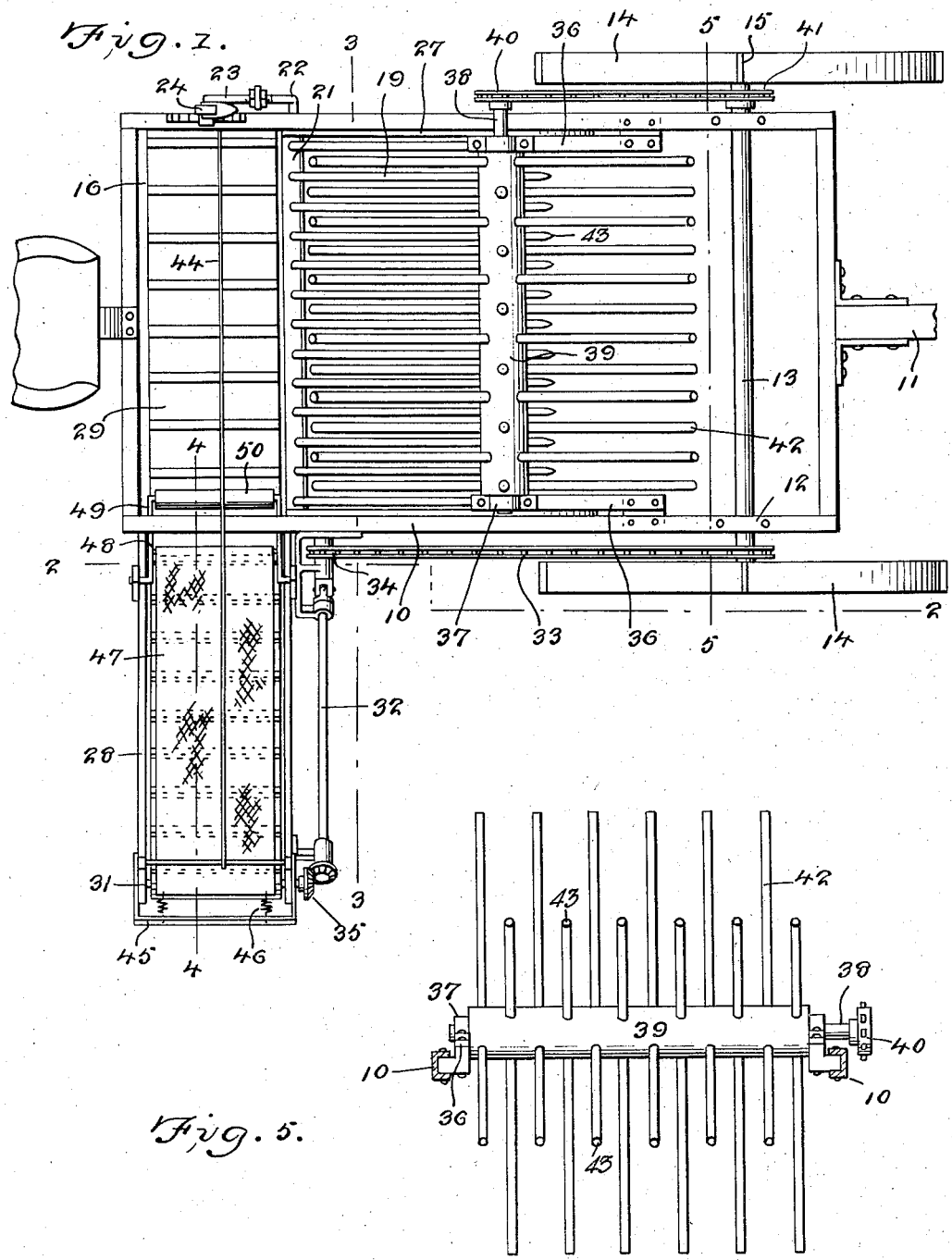
James H. Hall INVENTOR
BY Victor J. Evans & Co.
ATTORNEYS Jan. 24, 1939.  J. H. HALL  2,144,970
TOPPED BEET GATHERING AND LOADING MACHINE
Filed Jan. 3, 1938   2 Sheets-Sheet 2
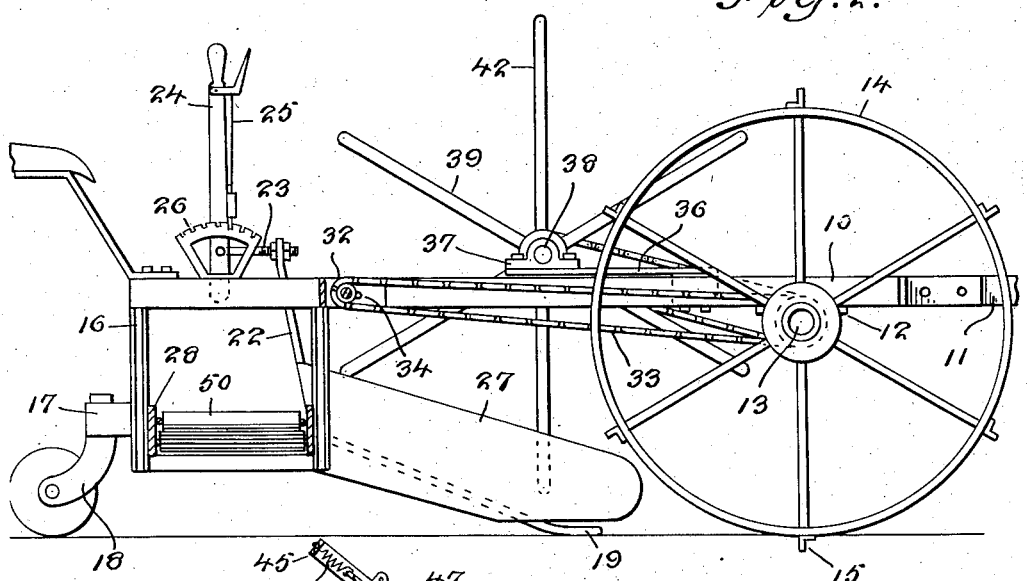
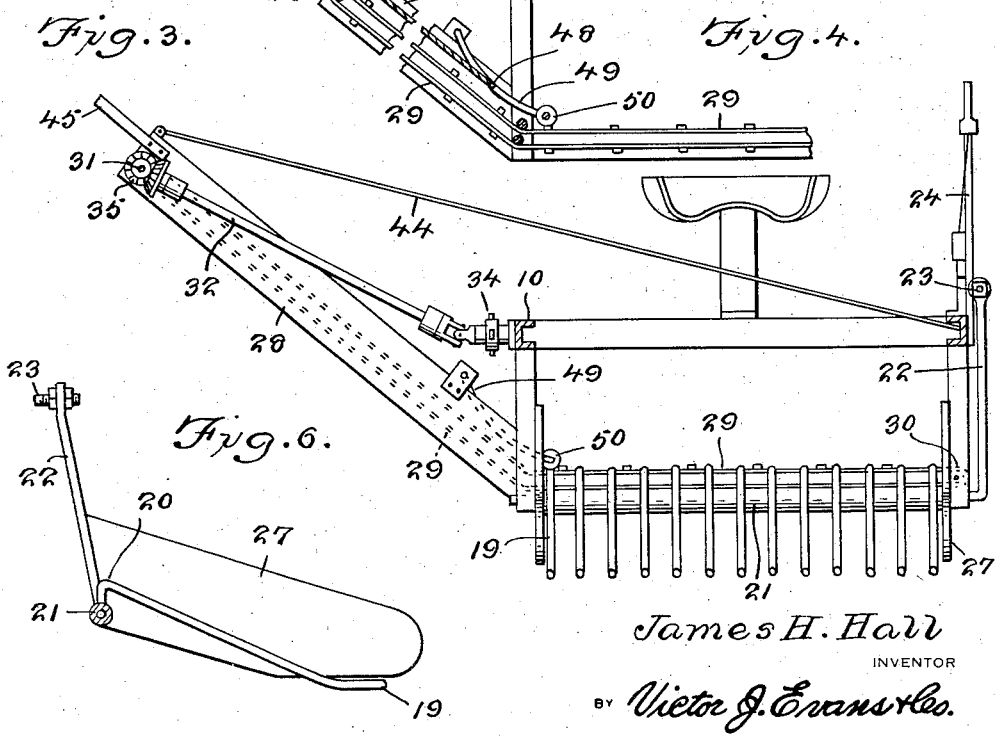
James H. Hall
INVENTOR
BY Victor J. Evans & Co.
ATTORNEYS Patented Jan. 24, 1939

2,144,970

UNITED STATES PATENT OFFICE 2,144,970

TOPPED BEET GATHERING AND LOADING MACHINE

James H. Hall, Yakima, Wash.

Application January 3, 1938, Serial No. 183,167

3 Claims. (Cl. 214—91)

The invention relates to a loading machine and more especially to a topped beet gathering and loading machine.

The primary object of the invention is the provision of a machine of this character, wherein beets after the topping and placing in rows thereof in a field can be collected from the ground and conveyed or elevated into a truck, wagon or the like for the hauling thereof to a place of deposit, the beets in the collecting and loading operation being handled with dispatch and without waste thereto when the machine is advanced over the ground.

Another object of the invention is the provision of a machine of this character, wherein the gathering operation is had in a novel manner and also the elevation of such beets for the loading of a receiver is carried forth in a unique manner, the gathering and the loading being automatically effected.

A further object of the invention is the provision of a machine of this character, wherein the same is under the control of an operator and the rake for the gathering of the beets is susceptible of adjustment with relation to the ground, being manually adjustable.

A further object of the invention is the provision of a machine of this character, which is simple in its construction, thoroughly reliable and efficient in operation, automatic in the working thereof, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a machine constructed in accordance with the invention.

Figure 2 is a sectional view on the line 2—2 of Figure 1.

Figure 3 is a sectional view on the line 3—3 of Figure 1.

Figure 4 is a fragmentary sectional view taken approximately on the line 4—4 of Figure 1.

Figure 5 is a sectional view on the line 5—5 of Figure 1.

Figure 6 is a fragmentary vertical sectional view through the rake of the machine.

Similar reference characters indicate corresponding parts throughout the several views in the drawings.

Referring to the drawings in detail, the machine, which in this instance is for the gathering and loading of beets after being topped and arranged in rows upon the ground in a field, comprises a chassis frame 10 preferably of substantially rectangular shape and has built therewith at its front or leading end a draft beam, pole or the like, a portion of the same being indicated at 11 and is of standard construction. While fixed to the side sills of this frame 10 slightly rearwardly of the lead or forward end are suitable bearings 12 in which is journaled the axle 13 carrying traction wheels 14 outside of the frame 10. The axle wheels are cleated at 15 and being fixed to the ends of the axle 13 extending laterally beyond opposite sides of the frame 10.

At the aft or rear end of the frame 10 and depending therefrom is a cross or transversely disposed trough 16 opening upwardly and forwardly with respect to the said frame 10 and also opening laterally at one end only thereof with respect to the frame. Medially with relation to the trough 16 and projecting rearwardly of the frame is a wheel caster bearing 17 in which is swiveled a wheeled caster 18 which wheel thereof and the traction wheels 14 travel on the surface of the ground.

Vertically swingable at the forward or front open end of the trough is a rake, its tines 19 are uniformly spaced from each other and are forwardly inclined in the direction of the ground, each being formed with an upwardly directed bend 20 next to the joinder of the same with the turning pivot 21 therefor. The pivot 21 is suitably journaled horizontally in the trough 16 at the front or forward open end thereof and is formed with an upwardly turned crank arm 22 having adjustable link connection 23 with a throw lever 24 swingingly supported at one side of the frame and is equipped with a spring tensioned hand releasable latch engageable with a keeper segment 26 stationarily carried by the frame 10. This lever 24 on manual actuation effects the raising and lowering of the rake tines 19. These tines 19 when lowered close to the ground gather topped beets when arranged in rows thereon.

The rake at opposite ends thereof is equipped with side boards or guards 27 to avoid the accidental dropping of beets when gathered by the rake from either end of the latter.

At the open end of the trough 16 and sloping in the direction of the trough is an elevator 28 having an endless loading belt conveyor or the like 29 which is carried through the trough 16 at the bottom thereof for receiving gathered beets from the rake tines 19, the bights 20 in the latter preventing or checking back flow of the beets from the said trough 16. The conveyor 29 is fitted to guide rollers 30 and is operated by a driven roller 31 from a power shaft 32 operated through chain and sprocket connections 33 and 34, respectively, with the axle 13, being companion gear connections 35 between the roller 31 and the shaft 32.

Upon the frame 10 rearwardly of the axle 13 and carried by the side sills of said frame are leaf spring-like yieldable bearing supports 36 having the bearings 37 for the axle 38 of a rotatable radially toothed push or gatherer wheel 39, the axle 38 being driven from the axle 13 through the chain and sprocket connections 40 and 41, respectively, therebetween. The tines or teeth of the wheel 39 involve groups of alternately arranged long and short tines or teeth 42 and 43, respectively, and this wheel 39 in the rotation thereof feeds the beets (not shown) gathered from the ground upwardly and rearwardly on the rake tines 19 for deposit onto the conveyor or the like 29 whence the elevator 28 will load a wagon, truck or the like therewith from the trough 16 at one side of the machine.

The elevator has connected therewith the brace 44 which is also connected with the frame 10 while disposed fixedly at the uppermost end of the elevator 28 is a bail 45 to which are connected tensioning springs 46, these being joined with an overhang apron, canvas or the like 47 with respect to the conveyor 29 at the upper stretch, the other end of the canvas, apron or the like 47 being joined with a cross bar 48 of a hanger bracket 49 for a presser roller 50 which rides the upper stretch of the conveyor 29 at the turn thereof from the trough 16 to the elevator 28, the bracket 49 being indirectly tensioned by the springs 46 through the canvas, apron or the like 47 and the latter avoids the falling back of beets upon the conveyor 29 during the loading operation of said elevator for the loading of a wagon, truck or the like thereby. The presser roller 50 functions as a belt or conveyor tightener for the conveyor 29 to avoid slipping thereof on the guide rollers 30.

When the machine is advanced in a field, the same will gather and load topped loose beets arranged in rows in the field, the loading being effected in a wagon, truck or the like.

The yieldable supports 36 avoid any choking action between the rake and the wheel 39 as the latter is susceptible of moving upwardly against the tension of the supports 36 and in this fashion relieving choking.

What is claimed is:

1. A machine of the character described comprising a frame, wheels forwardly of the frame and having a driving axle journaled on said frame, a trough depending at the rear of the frame, an elevator at said trough and laterally of the frame and having an endless conveyor working within the trough, a vertically swingable rake projecting forwardly of said trough for gathering and delivering material onto the conveyor within said trough, a pusher wheel carried by the frame above the rake and having driven connections with the said axle, manually operated means for raising and lowering the rake, means yieldably supporting said pusher wheel, driven connections between the conveyor and said axle, a presser roller at the elevator and active upon the conveyor at the point of communication of the trough with said elevator, and a tensioned apron overhanging the conveyor within the elevator.

2. A machine of the character described comprising a frame, wheels forwardly of the frame and having a driving axle journaled on said frame, a trough depending at the rear of the frame, an elevator at said trough and laterally of the frame and having an endless conveyor working within the trough, a vertically swingable rake projecting forwardly of said trough for gathering and delivering material onto the conveyor within said trough, a pusher wheel carried by the frame above the rake and having driven connections with the said axle, manually operated means for raising and lowering the rake, means yieldably supporting said pusher wheel, driven connections between the conveyor and said axle, a presser roller at the elevator and active upon the conveyor at the point of communication of the trough with said elevator, a tensioned apron overhanging the conveyor within the elevator, and a hanger bracket for said roller and having connection with said apron.

3. A machine of the character described comprising a frame, wheels forwardly of the frame and having a driving axle journaled on said frame, a trough depending at the rear of the frame, an elevator at said trough and laterally of the frame and having an endless conveyor working within the trough, a vertically swingable rake projecting forwardly of said trough for gathering and delivering material onto the conveyor within said trough, a pusher wheel carried by the frame above the rake and having driven connections with the said axle, manually operated means for raising and lowering the rake, means yieldably supporting said pusher wheel, driven connections between the conveyor and said axle, a presser roller at the elevator and active upon the conveyor at the point of communication of the trough with said elevator, a tensioned apron overhanging the conveyor within the elevator, a hanger bracket for said roller and having connection with said apron, and tines included in said rake and having upwardly directed bights rearwardly therein.

JAMES H. HALL.